(12) United States Patent
Pak (10) Patent No.: US 8,346,501 B2
(45) Date of Patent: Jan. 1, 2013

(54) INDUSTRIAL ROLL WITH SENSORS ARRANGED TO SELF-IDENTIFY ANGULAR LOCATION

(75) Inventor: Kisang Pak, Winchester, VA (US)

(73) Assignee: Stowe Woodward, L.L.C., Middletown, VA (US)

( * ) Notice: Subject to any disclaimer, the term of this patent is extended or adjusted under 35 U.S.C. 154(b) by 363 days.

(21) Appl. No.: 12/488,753

(22) Filed: Jun. 22, 2009

(65) Prior Publication Data

US 2010/0324856 A1    Dec. 23, 2010

(51) Int. Cl.
*G01L 7/00* (2006.01)
(52) U.S. Cl. .......................... 702/138; 702/151
(58) Field of Classification Search .................. 702/138, 702/151
See application file for complete search history.

(56) References Cited

U.S. PATENT DOCUMENTS

| | | |
|---|---|---|
| 2,815,907 A | 12/1957 | McCormick |
| 3,308,476 A | 3/1967 | Kleesattel |
| 3,562,883 A | 2/1971 | Kobayashi |
| 3,665,650 A | 5/1972 | Przygocki |
| 3,962,911 A | 6/1976 | Grenlund |
| 4,016,756 A | 4/1977 | Kunkle |
| 4,233,011 A | 11/1980 | Bolender et al. |
| 4,262,251 A * | 4/1981 | Fujishiro et al. ......... 324/207.25 |
| 4,352,481 A | 10/1982 | Forward |
| 4,356,447 A * | 10/1982 | Honig et al. .................. 324/169 |
| 4,366,025 A | 12/1982 | Gordon, Jr. et al. |
| 4,445,349 A | 5/1984 | Eibe |
| 4,498,383 A | 2/1985 | Pav et al. |
| 4,509,237 A | 4/1985 | Volz et al. |

(Continued)

FOREIGN PATENT DOCUMENTS

DE    863133    1/1953

(Continued)

OTHER PUBLICATIONS

Definition of "Industrial", Dictionary.com.*

(Continued)

*Primary Examiner* — Cindy H Khuu
*Assistant Examiner* — Timothy H Hwang
(74) *Attorney, Agent, or Firm* — Myers Bigel Sibley & Sajovec (57) ABSTRACT

An industrial roll includes: a substantially cylindrical core having an outer surface; a polymeric cover circumferentially overlying the core outer surface; and a sensing system. The sensing system comprises: a plurality of sensors embedded in the cover, the sensors configured to detect an operating parameter of the roll and provide signals representative of the operating parameter, wherein one of the plurality of sensors is a tracking sensor and the remaining sensors are non-tracking sensors; and a processor operatively associated with the sensors that processes signals provided by the sensors. The sensors are arranged at a substantially equal radial distance from the core outer surface, such that they define a circle when viewed from an end of the roll. Each of the non-tracking sensors is further arranged at a substantially equal first angular distance from its immediate non-tracking sensor neighbors, two endmost non-tracking sensors defining an angular gap. The tracking sensor is disposed in the angular gap, such that a second angular distance defined by the tracking sensor and either of the endmost sensors differs from the first angular distance. In this configuration, the sensing system can identify from which sensor signals are generated without a trigger signal generator or accelerometer.

24 Claims, 3 Drawing Sheets

U.S. PATENT DOCUMENTS

| | | | |
|---|---|---|---|
| 4,553,427 A * | 11/1985 | Kuraoka et al. | 73/114.26 |
| 4,729,153 A | 3/1988 | Pav et al. | |
| 4,797,827 A * | 1/1989 | Cockerham | 701/101 |
| 4,871,908 A | 10/1989 | Shuratovsky et al. | |
| 4,898,012 A | 2/1990 | Jones et al. | |
| 4,903,517 A | 2/1990 | Van Haag et al. | |
| 4,910,985 A | 3/1990 | Ballyns | |
| 4,938,045 A | 7/1990 | Rosenstock et al. | |
| 5,048,353 A * | 9/1991 | Justus et al. | 73/862.55 |
| 5,086,220 A | 2/1992 | Berthold et al. | |
| 5,165,271 A * | 11/1992 | Stepper et al. | 73/114.27 |
| 5,379,652 A | 1/1995 | Allonen | |
| 5,383,371 A | 1/1995 | Laitinen | |
| 5,466,343 A | 11/1995 | Kankaanpaa | |
| 5,562,027 A * | 10/1996 | Moore | 100/35 |
| 5,592,875 A | 1/1997 | Moschel | |
| 5,604,304 A * | 2/1997 | Kokubo et al. | 73/114.63 |
| 5,684,912 A | 11/1997 | Slaney et al. | |
| 5,699,729 A | 12/1997 | Moschel | |
| 5,739,626 A | 4/1998 | Kojima et al. | |
| 5,780,131 A * | 7/1998 | Paasonen et al. | 428/35.9 |
| 5,915,648 A | 6/1999 | Malrzak et al. | |
| 5,925,220 A | 7/1999 | Hirsch et al. | |
| 5,947,401 A | 9/1999 | Niccum | |
| 5,953,230 A | 9/1999 | Moore | |
| 6,284,103 B1 | 9/2001 | Eng et al. | |
| 6,341,522 B1 | 1/2002 | Goss et al. | |
| 6,354,013 B1 | 3/2002 | Mucke et al. | |
| 6,361,483 B1 | 3/2002 | Kirchner | |
| 6,409,645 B1 * | 6/2002 | Paasonen et al. | 492/56 |
| 6,432,031 B1 * | 8/2002 | Paasonen et al. | 492/56 |
| 6,441,904 B1 | 8/2002 | Shakespeare | |
| 6,617,764 B2 | 9/2003 | Sebastian et al. | |
| 6,644,273 B1 * | 11/2003 | Hagari et al. | 123/406.18 |
| 6,752,908 B2 * | 6/2004 | Gustafson et al. | 162/358.3 |
| 6,892,563 B2 | 5/2005 | Gustafson et al. | |
| 6,910,376 B2 | 6/2005 | Maenpaa | |
| 6,981,935 B2 * | 1/2006 | Gustafson | 492/10 |
| 6,988,398 B2 | 1/2006 | Saloniemi et al. | |
| 7,185,537 B2 | 3/2007 | Muhs | |
| 7,225,688 B2 | 6/2007 | Moore et al. | |
| 7,572,214 B2 | 8/2009 | Gustafson | |
| 2004/0053758 A1 | 3/2004 | Gustafson | |
| 2006/0090574 A1 * | 5/2006 | Moore et al. | 73/862.55 |
| 2006/0207319 A1 * | 9/2006 | Krozer et al. | 73/146 |
| 2006/0241895 A1 * | 10/2006 | Falsett et al. | 702/151 |
| 2009/0267594 A1 * | 10/2009 | Kather | 324/207.25 |

FOREIGN PATENT DOCUMENTS

| | | |
|---|---|---|
| DE | 199 20 133 | 11/2000 |
| EP | 1 653 207 A2 | 5/2006 |
| EP | 1719836 A1 | 11/2006 |
| FR | 2 769 379 | 4/1999 |
| WO | WO 96/34262 | 10/1996 |
| WO | WO 01/53787 A1 | 7/2001 |
| WO | WO 2005/113891 A1 | 12/2005 |

OTHER PUBLICATIONS

The Extended European Search Report for European Patent Application No. 10166806.9—2314; dated Oct. 13, 2010.

Anonymous "*Les capteurs à fibres optiques opérationnels?*" vol. 51. No. 13 (Oct. 20, 1986) pp. 49-51, 53, 55 XP002083807.

A. Bazergui and M.L. Meyer; *Embedded Strain Gages for the Measurement of Strains in Rolling Contact*; Experimental Mechanics, Oct. 1968, pp. 433-441.

Aris C. Spengos; *Experimental Investigation of Rolling Contact*; Journal of Applied Mechanics, Dec. 1965, pp. 859-864.

S.F. Knowles, et al.; *Multiple microbending optical-fibre sensors for measurement of fuel quantity in aircraft fuel tanks*; Sensors and Actuators vol. 68. No. 1-3 (Jun. 15, 1998) pp. 320-323 XP004139852.

Tom McCollum and Gary B. Spector; *Fiber optic microbend sensor for detection of dynamic fluid pressure at gear interfaces*; vol. 65, No. 3, (Mar. 1, 1994) pp. 724-729 XP000435198.

Samuel F. Keller; *Measurement of the Pressure-Time Profile in a Rolling Calender Nip*; $77^{th}$ Annual Meeting of the Canadian Section of the Pulp and Paper Assn. 1991, pp. B89-B96.

G.J. Parish; *Measurements of pressure distribution between metal and rubber covered rollers*; British Journal of Applied Physics, vol. 9, Apr. 1959, pp. 158-161.

J. Koriseva et al; *Soft calendar nip: an interesting subject for research and measurement*; Paper and Timber, 73 (1991): 5 pp. 419-423.

James P. McNamee: *A Study of Rubber Covered Press Roll Nip Dynamics. Part 1*; The Journal of the Technical Association of the Pulp and Paper Industry, vol. 48, No. 12, Dec. 1965, pp. 673-679.

Terry L. Merriman; *Transducers and Techniques of Contact Pressure Measurement*; The Society for Experimental Mechanics, Spring Conference, Jun. 1991, pp. 318-320.

International Search Report for PCT/US01/02013.

PCT International Search Report PCT/US03/18895 mailed on Sep. 30, 2003.

International Search Report and Written Opinion of the International Searching Authority for International patent application No. PCT/US2005/016456 mailed on Sep. 5, 2005.

European Search Report for EP 05 02 7237, dated Aug. 29, 2006.

* cited by examiner

INDUSTRIAL ROLL WITH SENSORS ARRANGED TO SELF-IDENTIFY ANGULAR LOCATION

FIELD OF THE INVENTION

The present invention relates generally to industrial rolls, and more particularly to rolls for papermaking.

BACKGROUND OF THE INVENTION

In a typical papermaking process, a water slurry, or suspension, of cellulosic fibers (known as the paper "stock") is fed onto the top of the upper run of an endless belt of woven wire and/or synthetic material that travels between two or more rolls. The belt, often referred to as a "forming fabric," provides a papermaking surface on the upper surface of its upper run which operates as a filter to separate the cellulosic fibers of the paper stock from the aqueous medium, thereby forming a wet paper web. The aqueous medium drains through mesh openings of the forming fabric, known as drainage holes, by gravity or vacuum located on the lower surface of the upper run (i.e., the "machine side") of the fabric.

After leaving the forming section, the paper web is transferred to a press section of the paper machine, where it is passed through the nips of one or more presses (often roller presses) covered with another fabric, typically referred to as a "press felt." Pressure from the presses removes additional moisture from the web; the moisture removal is often enhanced by the presence of a "batt" layer of the press felt. The paper is then transferred to a dryer section for further moisture removal. After drying, the paper is ready for secondary processing and packaging.

Cylindrical rolls are typically utilized in different sections of a papermaking machine, such as the press section. Such rolls reside and operate in demanding environments in which they can be exposed to high dynamic loads and temperatures and aggressive or corrosive chemical agents. As an example, in a typical paper mill, rolls are used not only for transporting the fibrous web sheet between processing stations, but also, in the case of press section and calender rolls, for processing the web sheet itself into paper.

Typically rolls used in papermaking are constructed with the location within the papermaking machine in mind, as rolls residing in different positions within the papermaking machines are required to perform different functions. Because papermaking rolls can have many different performance demands, and because replacing an entire metallic roll can be quite expensive, many papermaking rolls include a polymeric cover that surrounds the circumferential surface of a typically metallic core. By varying the material employed in the cover, the cover designer can provide the roll with different performance characteristics as the papermaking application demands. Also, repairing, regrinding or replacing a cover over a metallic roll can be considerably less expensive than the replacement of an entire metallic roll. Exemplary polymeric materials for covers include natural rubber, synthetic rubbers such as neoprene, styrene-butadiene (SBR), nitrile rubber, chlorosulfonated polyethylene ("CSPE"—also known under the trade name HYPALON® from DuPont), EDPM (the name given to an ethylene-propylene terpolymer formed of ethylene-propylene diene monomer), polyurethane, thermoset composites, and thermoplastic composites.

In many instances, the roll cover will include at least two distinct layers: a base layer that overlies the core and provides a bond thereto; and a topstock layer that overlies and bonds to the base layer and serves the outer surface of the roll (some rolls will also include an intermediate "tie-in" layer sandwiched by the base and top stock layers). The layers for these materials are typically selected to provide the cover with a prescribed set of physical properties for operation. These can include the requisite strength, elastic modulus, and resistance to elevated temperature, water and harsh chemicals to withstand the papermaking environment. In addition, covers are typically designed to have a predetermined surface hardness that is appropriate for the process they are to perform, and they typically require that the paper sheet "release" from the cover without damage to the paper sheet. Also, in order to be economical, the cover should be abrasion- and wear-resistant.

As the paper web is conveyed through a papermaking machine, it can be very important to understand the pressure profile experienced by the paper web. Variations in pressure can impact the amount of water drained from the web, which can affect the ultimate sheet moisture content, thickness, and other properties. The magnitude of pressure applied with a roll can, therefore, impact the quality of paper produced with the paper machine.

It is known to include pressure and/or temperature sensors in the cover of an industrial roll. For example, U.S. Pat. No. 5,699,729 to Moschel et al. describes a roll with a helically-disposed leads that includes a plurality of pressure sensors embedded in the polymeric cover of the roll. The sensors are helically disposed in order to provide pressure readings at different axial locations along the length of the roll. Typically the sensors are connected to two leads or an optical fiber which transmit sensor signals to a processor that processes the signals and provides pressure and position information.

Because multiple sensors are attached to the two common leads or fiber, the signals from different sensors travel along the same leads or fiber. Therefore, the processor should have some way to distinguish which sensor has produced a particular signal; otherwise, the processor does not recognize the axial position of the sensor providing the signal. One common technique is the use of a "trigger" signal that alerts the processor to each revolution of the roll. This technique, described in U.S. Pat. No. 5,699,729, supra, employs a trigger signal generator that provides a signal every time a particular position on the roll passes a particular location. However, this technique requires the equipment for producing and deciphering the trigger signal. Another technique employs an accelerometer mounted to the roll to determine the roll's orientation. This technique also requires additional equipment and tracking capability. It may be desirable to provide an alternative technique for monitoring sensor position.

SUMMARY OF THE INVENTION

The present invention can address some of the issues raised by prior industrial rolls. As a first aspect, embodiments of the present invention are directed to an industrial roll, comprising: a substantially cylindrical core having an outer surface; a polymeric cover circumferentially overlying the core outer surface; and a sensing system. The sensing system comprises: a plurality of sensors embedded in the cover, the sensors configured to detect an operating parameter of the roll and provide signals representative of the operating parameter, wherein one of the plurality of sensors is a tracking sensor and the remaining sensors are non-tracking sensors; and a processor operatively associated with the sensors that processes signals provided by the sensors. The sensors are arranged at a substantially equal radial distance from the core outer surface, such that they define a circle when viewed from an end of the roll. Each of the non-tracking sensors is further arranged at a substantially equal first angular distance from its immediate non-tracking sensor neighbors, two endmost non-tracking sensors defining an angular gap. The tracking sensor is disposed in the angular gap, such that a second angular distance defined by the tracking sensor and either of the endmost sensors differs from the first angular distance. In this configuration, the sensing system can identify from which sensor signals are generated without a trigger signal generator or accelerometer.

As a second aspect, embodiments of the present invention are directed to a method of measuring the pressure experience by an industrial roll. The method begins with (a) providing an industrial roll, comprising: a substantially cylindrical core having an outer surface; a polymeric cover circumferentially overlying the core outer surface; and a sensing system. The sensing system comprises: a plurality of sensors embedded in the cover, the sensors configured to detect pressure and provide signals representative of the pressure, wherein one of the plurality of sensors is a tracking sensor and the remaining sensors are non-tracking sensors; and a processor operatively associated with the sensors that processes signals provided by the sensors. The sensors are arranged at a substantially equal radial distance from the core outer surface, such that they define a circle when viewed from an end of the roll. Each of the non-tracking sensors is further arranged at a substantially equal first angular distance from its immediate non-tracking sensor neighbors, two endmost non-tracking sensors defining an angular gap. The tracking sensor is disposed in the angular gap, such that a second angular distance defined by the tracking sensor and either of the endmost sensors differs from the first angular distance. The method continues with (b) rotating the roll to expose each of the sensors to pressure conditions; (c) transmitting signals generated by the sensors from the sensors to a processor; (d) identifying the signals from the tracking sensor based on the duration between signals; and (e) identifying the sensor from which each signal originates based on the identification of the tracking sensor.

As a third aspect, embodiments of the present invention are directed to a method of measuring pressure experienced by an industrial roll. The method begins with: (a) providing an industrial roll, comprising: a substantially cylindrical core having an outer surface; a polymeric cover circumferentially overlying the core outer surface; and a sensing system comprising: a plurality of sensors embedded in the cover, the sensors configured to detect pressure of the roll and provide signals representative of the pressure, wherein one of the plurality of sensors is a tracking sensor and the remaining sensors are non-tracking sensors; and a processor operatively associated with the sensors that processes signals provided by the sensors. The sensors are arranged at a substantially equal radial distance from the core outer surface, such that they define a circle when viewed from an end of the roll. The tracking sensor is disposed at an angular distance from at least one of its immediate sensor neighbors that differs from an angular distance between any other non-tracking sensor and its non-tracking sensor neighbors. The method continues with: (b) rotating the roll to expose each of the sensors to pressure conditions; (c) transmitting signals generated by the sensors from the sensors to a processor; (d) identifying the signals from the tracking sensor based on the duration between signals; and (e) identifying the sensor from which each signal originates based on the identification of the tracking sensor.

As a fourth aspect, embodiments of the present invention are directed to a method of determining the rotative direction of an industrial roll. The method begins with (a) providing an industrial roll, comprising: a substantially cylindrical core having an outer surface; a polymeric cover circumferentially overlying the core outer surface; and a sensing system comprising: a plurality of sensors embedded in the cover, the sensors configured to detect pressure of the roll and provide signals representative of the pressure; and a processor operatively associated with the sensors that processes signals provided by the sensors. The sensors are arranged at a substantially equal radial distance from the core outer surface, such that they define a circle when viewed from an end of the roll. A first sensor is disposed at a first angular distance from at least one of its immediate sensor neighbors that differs from an angular distance between any other sensor and its immediate sensor neighbors. A second sensor is disposed at a second angular distance that differs from the first distance and from an angular distance between any other sensors and its immediate sensor neighbors. The method continues with: (b) rotating the roll to expose each of the sensors to pressure conditions; (c) transmitting signals generated by the sensors from the sensors to a processor; and (d) identifying the rotative direction of the roll based on the relative sequence of signals transmitted by the first and second sensors.

DETAILED DESCRIPTION OF EMBODIMENTS OF THE INVENTION

The present invention will be described more particularly hereinafter with reference to the accompanying drawings. The invention is not intended to be limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity.

Well-known functions or constructions may not be described in detail for brevity and/or clarity.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. As used herein, the term "and/or" includes any and all combinations of one or more of the associated listed items. Where used, the terms "attached", "connected", "interconnected", "contacting", "coupled", "mounted," "overlying" and the like can mean either direct or indirect attachment or contact between elements, unless stated otherwise.

Figure 1:
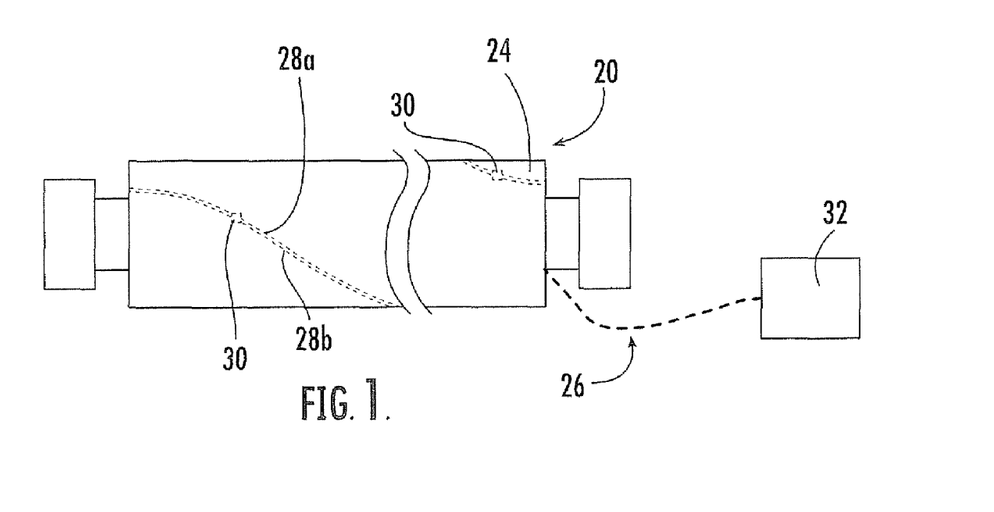
FIG. 1 is a gage view of a roll and detecting system of the present invention.

Referring now to the figures, a roll, designated broadly at 20, is illustrated in FIG. 1. The roll 20 includes a hollow cylindrical shell or core 22 (see FIG. 2) and a cover 24 (typically formed of one or more polymeric materials) that encircles the core 22. A sensing system 26 for sensing pressure includes a pair of electrical leads 28a, 28b and a plurality of pressure sensors 30, each of which is embedded in the cover 24. As used herein, a sensor being "embedded" in the cover means that the sensor is either entirely contained within the cover, and a sensor being "embedded" in a particular layer or set of layers of the cover means that the sensor is entirely contained within that layer or set of layers. The sensing system 26 also includes a processor 32 that processes signals produced by the piezoelectric sensors 30.

Figure 2:
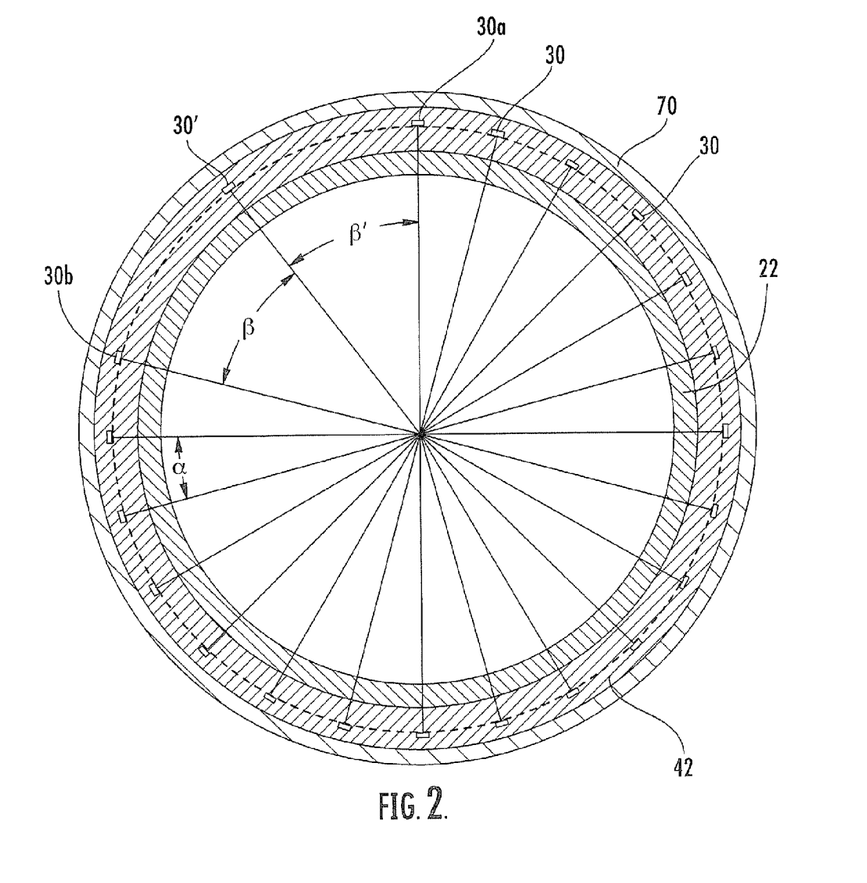
FIG. 2 is an end view of the roll and detecting system of FIG. 1 showing the circumferential spacing of the sensors.

The core 22 is typically formed of a metallic material, such as steel or cast iron. The core 22 can be solid or hollow, and if hollow may include devices that can vary pressure or roll profile.

The cover 24 can take any form and can be formed of any polymeric and/or elastomeric material recognized by those skilled in this art to be suitable for use with a roll. Exemplary materials include natural rubber, synthetic rubbers such as neoprene, styrene-butadiene (SBR), nitrile rubber, chlorosulfonated polyethylene ("CSPE"—also known under the trade name HYPALON), EDPM (the name given to an ethylene-propylene terpolymer formed of ethylene-propylene diene monomer), epoxy, and polyurethane. The cover 24 may also include reinforcing and filler materials, additives, and the like. Exemplary additional materials are discussed in U.S. Pat. No. 6,328,681 to Stephens, U.S. Pat. No. 6,375,602 to Jones, and U.S. Pat. No. 6,981,935 to Gustafson, the disclosures of each of which are hereby incorporated herein in their entireties.

Figure 3:
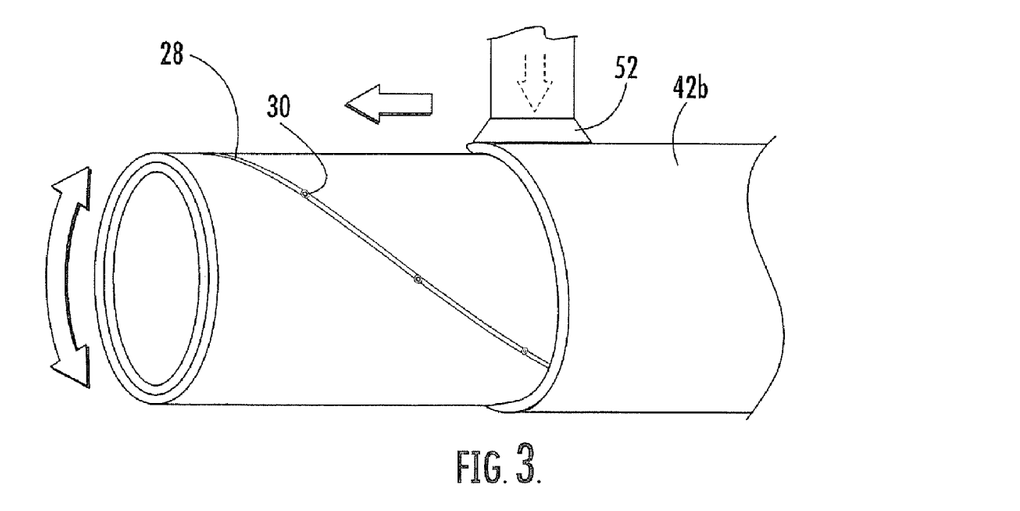
FIG. 3 is a gage perspective view of the outer base layer being applied over the inner base layer, cables and sensors of the roll of FIG. 1.
Figure 4:
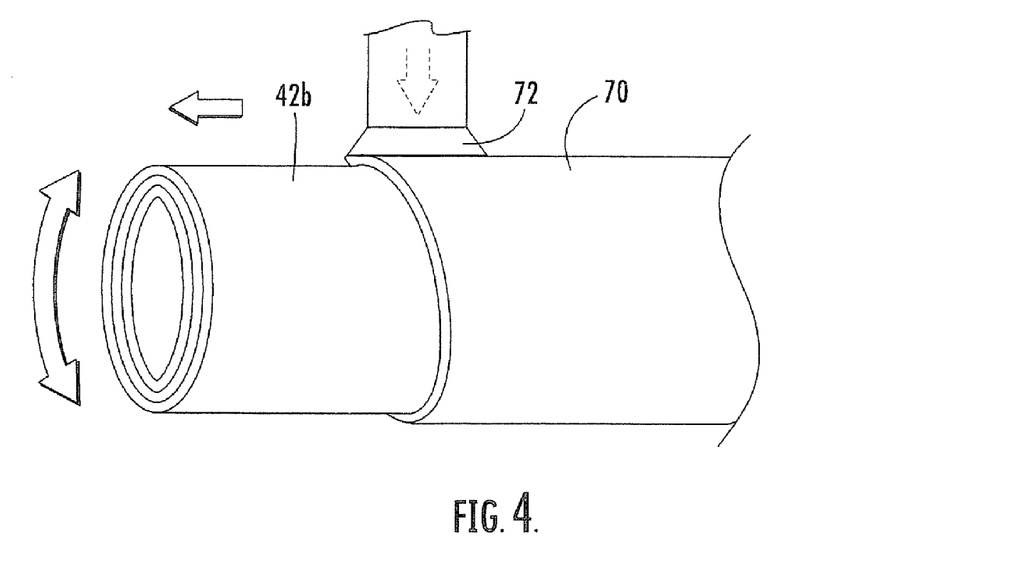
FIG. 4 is a gage perspective view of the topstock layer being applied over the outer base layer of FIG. 3.

In many instances, the cover 24 will comprise multiple layers. FIGS. 3 and 4 illustrate the application of an inner base layer 42a, an outer base layer 42b and a topstock layer 70; additional layers, such as a "tie-in" layer between the outer base and topstock layers 42b, 70 and an adhesive layer between the shell 22 and the inner base layer 42a, may also be included.

Referring again to FIG. 1, the sensors 30 of the sensing system 26 can take any shape or form recognized by those skilled in this art as being suitable for detecting pressure, including piezoelectric sensors, optical sensors and the like. Exemplary sensors are discussed in U.S. Pat. No. 5,699,729 to Moschel et al.; U.S. Pat. No. 5,562,027 to Moore; U.S. Pat. No. 6,981,935 to Gustafson; and U.S. Pat. No. 6,429,421 to Meller; and U.S. Patent Publication Nos. 2005/0261115 to Moore and 2006024872 to Gustafson, the disclosures of each of which are incorporated herein by reference. Piezoelectric sensors can include any device that exhibits piezoelectricity when undergoing changes in pressure, temperature or other physical parameters. "Piezoelectricity" is defined as the generation of electricity or of electrical polarity in dielectric crystals subjected to mechanical or other stress, the magnitude of such electricity or electrical polarity being sufficient to distinguish it from electrical noise. Exemplary piezoelectric sensors include piezoelectric sensors formed of piezoelectric ceramic, such as PZT-type lead-zirgonate-titanate, quartz, synthetic quartz, tourmaline, gallium ortho-phosphate, CGG ($Ca_3Ga_2Ge_4O_{14}$), lithium niobate, lithium tantalite, Rochelle salt, and lithium sulfate-monohydrate. In particular, the sensor material can have a Curie temperature of above 350° F., and in some instances 600° F., which can enable accurate sensing at the temperatures often experienced by rolls in papermaking environments. A typical outer dimension of the sensor 30 (i.e., length, width, diameter, etc.) is between about 2 mm and 20 mm, and a typical thickness of the sensor 30 is between about 0.002 and 0.2 inch.

In the illustrated embodiment, the sensors 30 are tile-shaped, i.e., square and flat; however, other shapes of sensors and/or apertures may also be suitable. For example, the sensors 30 themselves may be rectangular, circular, annular, triangular, oval, hexagonal, octagonal, or the like. Also, the sensors 30 may be solid, or may include an internal or external aperture, (i.e., the aperture may have a closed perimeter, or the aperture may be open-ended, such that the sensor 30 takes a "U" or "C" shape). See, e.g., U.S. Patent Publication No. 20060248723 to Gustafson, the disclosure of which is hereby incorporated herein in its entirety.

Turning now to FIG. 2, the sensors 30 are distributed around the circumference of the roll 20 at a substantially equal radial distance from the center of the core 22, such that they define a circle C, and as shown in FIG. 1, the sensors 30 are spaced axially from each other along the length of the roll 20, typically at substantially equal intervals. The sensors 30 are also arranged such that all of the sensors but one (referred to herein as the tracking sensor 30') are generally evenly spaced circumferentially from each other as viewed from the end of the roll 20 as in FIG. 2. In the illustrated embodiment, the non-tracking sensors 30 are separated from their immediately adjacent neighboring sensors 30 by an angular distance α of 15 degrees, but other angular distances of separation may be employed. An angular gap is formed by two "endmost" sensors 30a, 30b (i.e., non-tracking sensors that have only one immediate non-tracking sensor neighbor, so they are "endmost" in the sense that they form the ends of the arc defined by the non-tracking sensors 30 along the circle C).

Still referring to FIG. 2, the tracking sensor 30' is spaced from its immediate neighbors, the endmost sensors 30a, 30b, by an angular distance β that (a) differs from the angular distance α between the other sensors 30, and (b) also differs from twice the angular distance α between the other sensors 30. In the illustrated embodiment, the tracking sensor 30' is separated from endmost sensors 30a and 30b by an angular distance β of 37.5 degrees. In this example, it can be seen that the angular distance β of 37.5 degrees differs from both the angular distance α of 15 degrees and from twice the value of α (30 degrees). The significance of these angular relationships is discussed in detail below.

Referring again to FIG. 1, the leads 28a, 28b of the sensing system 26 can be any signal-carrying members recognized by those skilled in this art as being suitable for the passage of electrical signals in a roll. In some embodiments, the lead 28a passes below each sensor 30 on one transverse edge thereof, and the lead 28b passes above each sensor 30 on a diametrically opposed transverse edge thereof. Alternatively, the leads may be positioned on the same surface of the sensor 30. As another alternative, the sensor 30 may have "wings" extending radially outwardly from the edge of the sensor that contact the leads.

Referring once again to FIG. 1, the sensing system 26 includes a multiplexer 31 or other data collection device mounted to the end of the roll 20. The multiplexer 31 receives and collects signals from the sensors 30 and transmits them to a processor 32. The processor 32 is typically a personal computer or similar data exchange device, such as the distributive control system of a paper mill, that is operatively associated with the sensors 30 and that can process signals from the sensors 30 into useful, easily understood information. In some embodiments, a wireless communication mode, such as RF signaling, is used to transmit the data collected from the sensors 30 from the multiplexer 31 to the processor 32. Other alternative configurations include slip ring connectors that enable the signals to be transmitted by the sensors 30 to the processor 32. Suitable exemplary processing units are discussed in U.S. Pat. No. 5,562,027 and U.S. Pat. No. 7,392,715 to Moore and U.S. Pat. No. 6,752,908 to Gustafson et al., the disclosures of each of which are hereby incorporated herein in their entireties.

The roll 20 can be manufactured in the manner described, for example, in pending U.S. Patent Publication No. 2005/0261115, the disclosure of which is hereby incorporated herein in its entirety. In this method, initially the core 22 is covered with a portion of the cover 24 (such as the inner base layer 42a). The inner base layer 42a can be applied with an extrusion nozzle 40, although the inner base layer 42a may be applied by other techniques known to those skilled in this art. Typically the inner base layer 42a is formed of rubber or epoxy-based composite materials, and has a thickness of between about 0.030 and 0.350 inches.

After the formation of the inner base layer 42a, the leads 28a, 28b and sensors 30 of the sensor system 26 are installed (FIG. 3). Once the sensors 30 are in desired positions, they can be adhered in place. This may be carried out by any technique known to those skilled in this art; an exemplary technique is adhesive bonding.

Referring again to FIG. 3, once the sensors 30 and leads 28a, 28b have been positioned and affixed to the inner base layer 42a, the remainder of the base layer 42 (i.e., the outer base layer 42b) is applied. FIG. 3 illustrates the application of the outer base layer 42b via an extrusion nozzle 52, although those skilled in this art will appreciate that the application of the outer base layer 42b can be carried out by any technique recognized as being suitable for such application. In a typical roll, the outer base layer 42b is formed of rubber or epoxy-based composite materials and has a thickness of between about 0.030 and 0.350 inches, such that the sensors 30 are embedded in the base layer 42. Also, typically the outer base layer 42a will be formed of the same material as the inner base layer 42a.

As noted above, the present invention is intended to include rolls having covers that include only a base layer and top stock layer as well as rolls having covers with additional intermediate layers. Any intermediate layers would be applied over the outer base layer 42b prior to the application of the topstock layer 70.

Turning now to FIG. 4, the topstock layer 70 is applied over the outer base layer 42b. The topstock layer 70 is typically formed of rubber or polyurethane, and may be applied via any technique known to those skilled in this art to be suitable for the application of a polymeric layer, although FIG. 4 illustrates application via an extrusion nozzle 72. The topstock layer 70 is typically a polymeric material that has a hardness that is lower than that of the base layer 42. The topstock layer 70 is ordinarily between about 0.200 and 4.00 inches in thickness. Application of the top stock layer 70 is followed by curing, techniques for which are well-known to those skilled in this art and need not be described in detail herein.

The completed roll 20 and cover 24 can then be used in, for example, a papermaking machine. In some embodiments, the roll 20 is part of a nip press, wherein another roll or pressing device is positioned adjacent the roll 20 to form a nip through which a forming paper web can pass. In such environments, it can be important to monitor the pressure experienced by the cover 24, particularly in the nip area. The sensing system 26 can provide pressure information for different axial locations along the cover 24, with each of the sensors 30 providing pressure information about a different axial location on the roll 20.

In operation, the roll 20 and cover 24 rotate about the axis of the roll 20 at very high speeds. Each time one of the sensors 30 passes through the nip created by the roll 20 and a mating roll or press, the sensor 30 will transmit a pulse generated by the pressure the mating roll exerts on the area of the cover 20 above the sensor 30. When no sensor 30 is present in the nip, no significant pulses beyond the level of general noise are generated. Thus, as the roll 20 rotates, each sensor 30 travels through the nip and provides pulses representative of the pressure at its corresponding location. Consequently, data in the form of pulses is generated by the sensors 30, transmitted along the leads 28a, 28b, and received in the multiplexer 31. In a typical data retrieval session, 12-20 pulses are received per sensor 30; these individual pulses can be stored and processed into representative pressure signals for each sensor 30. Once the raw sensor data is collected, it is sent from the multiplexer 31 to the processor 32 for processing into an easily understood form, such as a pressure profile of the roll 20 along its length.

As noted above, it is typically important for the user to be able to distinguish which sensor 30 is responsible for transmitting each of the pulses. Because the tracking sensor 30' is separated from its immediate neighbors 30a, 30b by a different angular distance than that of the other sensors 30, assuming constant rotational speed for the roll 20, the pulses generated by the tracking sensor 30' are separated from the pulses of its immediate neighboring sensors 30a, 30b by a different (in this instance, greater) duration than is the case for the pulses generated by the remaining sensors 30. As a result, as the pulse data is processed, the pulses generated by the tracking sensor 30' can be easily identified. Moreover, because the pulses of the tracking sensor 30' can be easily identified, pulses generated by the other sensors 30 can be assigned to their corresponding sensor 30 simply by comparing the time of the pulse to the time pulses of the tracking sensor 30'. Typically, the processor 32 will employ a software program that can read and interpret the sensor data. In some embodiments, the software uses a summation algorithm to recognize and identify individual sensors 30.

One of the potential advantages of employing a sensor arrangement such as that shown is that no additional trigger or orientation mechanism, such as an accelerometer, is needed to track the sensors 30; instead, the arrangement of the sensors 30 themselves enables the individual sensors 30 to be tracked. In addition, the spacing of the illustrated embodiment, in which (a) the angular distance $\beta$ between the tracking sensor 30' and its immediate neighboring non-tracking sensors 30a, 30b differs from the substantially equal angular distance $\alpha$ between the non-tracking sensors 30, and (b) twice or three times the "standard" angular distance $\alpha$ also differs from the distance $\beta$, can also provide another advantage. In the event that a sensor 30 fails (for example, it may become detached from one of the leads 28a, 28b), no pulses would be generated by that sensor 30. Thus, there would be a time gap equal to the duration required for the roll 20 to travel the angular distance 2a between the inoperative sensor's nearest neighbors. Because $2\alpha$ is not equal to $\beta$, the identity of the tracking sensor 30' can still be recognized even with an inoperative sensor 30. In fact, even if two or three neighboring sensors 30 failed, the angular distances $3\alpha$ and $4\alpha$ are also not equal to $\beta$, so the tracking sensor 30' is still uniquely identifiable. Therefore the failure of one sensor 30 does not render the sensing system unusable.

Those skilled in this art will appreciate that the sensor system illustrated herein may take other forms. For example, although piezoelectric sensors are discussed wherein, optical sensors or pressure sensors of other forms may also be used. As still another alternative, a wireless system (i.e., one that lacks leads 28a, 28b that carry signals from the sensors to the multiplexer 31), such as that described in U.S. Pat. No. 7,392,715 to Moore et al., may be employed; the disclosure of this patent is hereby incorporated herein in its entirety. With a wireless system, it can be seen that a sensor arrangement as described herein may simplify the signal identification operation for wireless sensors. It is also contemplated that other sensor types, such as temperature, moisture, and the like, may also benefit from the principles discussed with respect to embodiments of the present invention.

It should also be noted that, in some embodiments, the angles β may differ on either side of the tracking sensor 30'. For example, one angle β may be 35 degrees, whereas the other angle β' may be 40 degrees. In such a configuration, both angles β,β' differ from the angular distances α and 2α, such that the tracking sensor 30' can still be identified. However, in this embodiment, the difference in the angles β, β' can enable the system 26 to determine in which rotative direction (i.e., clockwise or counterclockwise) the roll 20 is rotating by noting the relative sequence of the angles β, β'. It should also be noted that different angles between other non-tracking sensors may be employed to enable determination of the rotative direction of the roll.

Further, although the sensors 30 are illustrated and described as being axially spaced equidistant from each other, in some embodiments the sensors may not be equidistantly spaced along the length of the roll. For example, in some embodiments groups of sensors may be more closely spaced at the ends of the roll (where more pressure issues tend to occur), and more widely spaced toward the center of the roll.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An industrial roll, comprising:
a substantially cylindrical metallic core having an outer surface;
a polymeric cover circumferentially overlying the core outer surface; and
a sensing system comprising:
a plurality of sensors embedded in the cover, the sensors configured to detect an operating parameter of the roll and provide signals representative of the operating parameter, wherein one of the plurality of sensors is a tracking sensor and the remaining sensors are non-tracking sensors; and
a processor operatively associated with the plurality of sensors that processes signals provided by the plurality of sensors;
wherein the plurality of sensors are arranged at a substantially equal radial distance from the core outer surface, such that they define a circle when viewed from an end of the roll; and
wherein each of the non-tracking sensors is further arranged at a substantially equal first angular distance from its immediate non-tracking sensor neighbors, two endmost non-tracking sensors defining an angular gap;
wherein the tracking sensor is disposed in the angular gap, such that a second angular distance defined by the tracking sensor and either of the endmost sensors differs from the first angular distance;
wherein the sensing system is configured to differentiate between the tracking sensor and the non-tracking sensor signals when one of the non-tracking sensors fails as the roll rotates.

2. The industrial roll defined in claim 1, wherein the second angular distance is greater than the first angular distance, and wherein the sum of two first angular distances differs from the second angular distance.

3. The industrial roll defined in claim 2, wherein the sum of three first angular distances differs from the second angular distance.

4. The industrial roll defined in claim 1, wherein a distance between the tracking sensor and each of the endmost sensors is the second distance.

5. The industrial roll defined in claim 1, wherein the first angular distance is 15 degrees.

6. The industrial roll defined in claim 5, wherein the second angular distance is 37.5 degrees.

7. The industrial roll defined in claim 1, wherein the sensors detect pressure.

8. The industrial roll defined in claim 7, wherein the sensors are piezoelectric sensors.

9. The industrial roll defined in claim 1, further comprising two electrical leads that electrically connect the sensors.

10. The industrial roll defined in claim 1, wherein the sensors are wireless sensors.

11. The industrial roll defined in claim 1, wherein the cover comprises an inner base layer and an outer topstock layer, and wherein the sensors are embedded in the base layer.

12. A method of measuring pressure experienced by an industrial roll, the method comprising the steps of:
(a) providing an industrial roll, comprising:
a substantially cylindrical metallic core having an outer surface;
a polymeric cover circumferentially overlying the core outer surface; and
a sensing system comprising:
a plurality of sensors embedded in the cover, the sensors configured to detect pressure of the roll and provide signals representative of the pressure, wherein one of the plurality of sensors is a tracking sensor and the remaining sensors are non-tracking sensors; and
a processor operatively associated with the plurality of sensors that processes signals provided by the plurality of sensors;
wherein the plurality of sensors are arranged at a substantially equal radial distance from the core outer surface, such that they define a circle when viewed from an end of the roll; and
wherein each of the non-tracking sensors is further arranged at a substantially equal first angular distance from its immediate non-tracking sensor neighbors, two endmost non-tracking sensors defining an angular gap;
wherein the tracking sensor is disposed in the angular gap, such that a second angular distance defined by the tracking sensor and either of the endmost sensors differs from the first angular distance wherein the sensing system is configured to differentiate between the tracking sensor and the non-tracking sensor signals when one of the non-tracking sensors fails as the roll rotates;
(b) rotating the roll to expose each of the plurality of sensors to pressure conditions;
(c) transmitting signals generated by the plurality of sensors from the plurality of sensors to the processor;

(d) identifying the signals from the tracking sensor based on the duration between signals; and (e) identifying the sensor from which each signal originates based on the identification of the tracking sensor.

13. The method defined in claim 12, wherein the second angular distance is greater than the first angular distance, and wherein the sum of two first angular distances differs from the second angular distance.

14. The method defined in claim 13, wherein the sum of three first angular distances differs from the second angular distance.

15. The method defined in claim 12, wherein a distance between the tracking sensor and each of the endmost sensors is the second distance.

16. The method defined in claim 12, wherein the first angular distance is 15 degrees.

17. The method defined in claim 16, wherein the second angular distance is 37.5 degrees.

18. The method defined in claim 12, wherein the sensors are piezoelectric sensors.

19. The method defined in claim 12, further comprising two electrical leads that electrically connect the sensors.

20. The method defined in claim 12, wherein the sensors are wireless sensors.

21. The method defined in claim 12, wherein the cover comprises an inner base layer and an outer topstock layer, and wherein the sensors are embedded in the base layer.

22. A method of measuring pressure experienced by an industrial roll, the method comprising the steps of:

(a) providing an industrial roll, comprising:
  a substantially cylindrical metallic core having an outer surface;
  a polymeric cover circumferentially overlying the core outer surface; and
a sensing system comprising:
  a plurality of sensors embedded in the cover, the sensors configured to detect pressure of the roll and provide signals representative of the pressure, wherein one of the plurality of sensors is a tracking sensor and the remaining sensors are non-tracking sensors; and
  a processor operatively associated with the plurality of sensors that processes signals provided by the plurality of sensors;
  wherein the plurality of sensors are arranged at a substantially equal radial distance from the core outer surface, such that they define a circle when viewed from an end of the roll; and
  wherein the tracking sensor is disposed at an angular distance from at least one of its immediate sensor neighbors that differs from an angular distance between any other non-tracking sensor and its non-tracking sensor neighbors wherein the sensing system is configured to differentiate between the tracking sensor and the non-tracking sensor signals when one of the non-tracking sensors fails as the roll rotates;

(b) rotating the roll to expose each of the plurality of sensors to pressure conditions;

(c) transmitting signals generated by the plurality of sensors from the plurality of sensors to the processor;

(d) identifying the signals from the tracking sensor based on the duration between signals; and (e) identifying the sensor from which each signal originates based on the identification of the tracking sensor.

23. An industrial roll, comprising:
a substantially cylindrical metallic core having an outer surface;
a polymeric cover circumferentially overlying the core outer surface; and
a sensing system comprising:
  a plurality of sensors embedded in the cover, the sensors configured to detect an operating parameter of the roll and provide signals representative of the operating parameter, wherein one of the plurality of sensors is a tracking sensor and the remaining sensors are non-tracking sensors; and
  a processor operatively associated with the plurality of sensors that processes signals provided by the plurality of sensors;
wherein the plurality of sensors are arranged at a substantially equal radial distance from the core outer surface, such that they define a circle when viewed from an end of the roll; and
wherein each of the non-tracking sensors is further arranged at a substantially equal first angular distance from its immediate non-tracking sensor neighbors, two endmost non-tracking sensors defining an angular gap;
wherein the tracking sensor is disposed in the angular gap, such that a second angular distance defined by the tracking sensor and either of the endmost sensors differs from and is greater than the first angular distance wherein the sensing system is configured to differentiate between the tracking sensor and the non-tracking sensor signals when one of the non-tracking sensors fails as the roll rotates.

24. The industrial roll defined in claim 23, wherein the second angular distance differs from twice the first angular distance.

* * * * *